United States Patent
Hermesh et al.

(10) Patent No.: US 10,552,343 B2
(45) Date of Patent: Feb. 4, 2020

(54) ZERO THRASH CACHE QUEUE MANAGER

(71) Applicant: Intel Corporation, Santa Clara, CA (US)

(72) Inventors: Barak Hermesh, Pardes Hana (IL); Ziv Kfir, Yavne (IL); Amos Klimker, Jerusalem (IL); Doron Nakar, Shoham (IL); Lior Nevo, Even Yehuda (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/826,105

(22) Filed: Nov. 29, 2017

(65) Prior Publication Data

US 2019/0034351 A1    Jan. 31, 2019

(51) Int. Cl.
| G06F 12/00 | (2006.01) |
| G06F 12/123 | (2016.01) |
| G06F 12/0862 | (2016.01) |
| G06F 9/50 | (2006.01) |
| G06F 9/38 | (2018.01) |

(52) U.S. Cl.
CPC .......... *G06F 12/123* (2013.01); *G06F 9/3855* (2013.01); *G06F 9/5016* (2013.01); *G06F 12/0862* (2013.01)

(58) Field of Classification Search
CPC .. G06F 12/123; G06F 12/0862; G06F 9/3855; G06F 9/5016
See application file for complete search history.

(56) References Cited

U.S. PATENT DOCUMENTS

| 6,151,661 | A  | * | 11/2000 | Adams, III | G06F 12/0875 711/132 |
| 6,704,822 | B1 | * | 3/2004  | Tremblay | G06F 9/5016 710/240 |
| 7,526,607 | B1 | * | 4/2009  | Singh | G06F 12/0804 711/118 |
| 2004/0107318 | A1 | * | 6/2004 | Bono | G06F 12/0866 711/118 |
| 2007/0136532 | A1 | * | 6/2007 | Irish | G06F 12/126 711/133 |
| 2010/0199048 | A1 | * | 8/2010 | Cypher | G06F 12/0817 711/141 |
| 2011/0173397 | A1 | * | 7/2011 | Boyle | G06F 12/0862 711/137 |
| 2014/0129779 | A1 | * | 5/2014 | Frachtenberg | G06F 12/122 711/136 |
| 2015/0269074 | A1 | * | 9/2015 | Shah | G06F 12/084 711/130 |

* cited by examiner

*Primary Examiner* — David Yi
*Assistant Examiner* — Tahilba O Puche
(74) *Attorney, Agent, or Firm* — Schwegman Lundberg & Woessner, P.A.

(57) ABSTRACT

Various systems and methods for queue management in computer memory are described herein. A system for implementing a zero thrash cache queue manager includes a processor subsystem to: receive a memory access request for a queue; write data to a queue tail cache line in a cache when the memory access request is to add data to the queue, the queue tail cache line protected from being evicted from the cache; and read data from a current queue head cache line in the cache when the memory access request is to remove data from the queue, the current queue head cache line protected from being evicted from the cache.

18 Claims, 6 Drawing Sheets

ZERO THRASH CACHE QUEUE MANAGER

TECHNICAL FIELD

Embodiments described herein generally relate to computer memory management, and in particular, to systems and methods to implement a zero thrash cache queue manager.

BACKGROUND

In computer microarchitecture, a cache is a memory that is used to store information temporarily for quicker access. Very often, a cache is implemented as a smaller, faster memory, closer to a processor core. The cache is used to store copies of the data from frequently used main memory locations. When a program makes a request for data from a memory location, the data may be stored in cache with the expectation that the data may be requested again in the near future. If the data is requested again, this results in a cache hit, and the data is served from the higher-speed cache instead of a lower-speed memory device, such as dynamic random access memory (DRAM). Because cache memory is typically more expensive to manufacture, and because cache memory is often implemented on-die, efficient cache use is paramount to ensure maximum system performance and maintain a smaller die size.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

When data is requested from memory, it is copied into cache in fixed-size blocks called "cache lines" or "cache blocks." When the processor needs to read or write a location in main memory, it checks the cache. If the memory location is in the cache, then it is deemed a cache hit, and the processor may read or write to the cache. If the memory location is not in cache, this is deemed a cache miss, and a new cache entry is created for the data read from the location in main memory. If the cache was previously full before the cache miss, an eviction policy is used to determine which cache entry is deleted or overwritten to make room for the new cache entry.

Cache thrashing involves frequently evicting the 'wrong' cache lines, causing them to be read and written to the external memory more than once. Thrashing results in worse performance than if there was no cache at all due to excessive cache misses. As a result, the cache experiences many cache misses so that the advantages of a cache are largely neutralized.

Cache thrashing may be experienced more with specific data structures, such as a queue, where the order of storing and retrieving data is the reverse of many assumptions in cache management. For instance, in many cases, cache management assumes both spatial and temporal locality to the subsequent data accesses. This is often a reasonable assumption because data that is more recently stored in cache is often more likely the data to be accessed in the near future. However, in queueing structure, data that is first stored (oldest data) is the first out (newest data request). Thus, due to the first-in-first-out (FIFO) nature of the queue-related accesses, a standard cache may experience cache thrashing.

The managed cache described in this document takes into consideration the nature of the queue-related accesses in order to guarantee that it will not cause thrashing regardless of the usage mode. So in general, every entry may be written and read from the main memory once at most, resulting in zero thrashing with respect to the queue data.

The mechanisms described here are usable for an size queue, which provides an advantage over other implementations that attempt to solve cache thrashing by using increased memory size and limiting the queue size. Local on-chip resources are not scalable for large queues and thus restrict the queue sizes to a relatively small number of entries compared to the queues located in main memory.

Figure 1A:
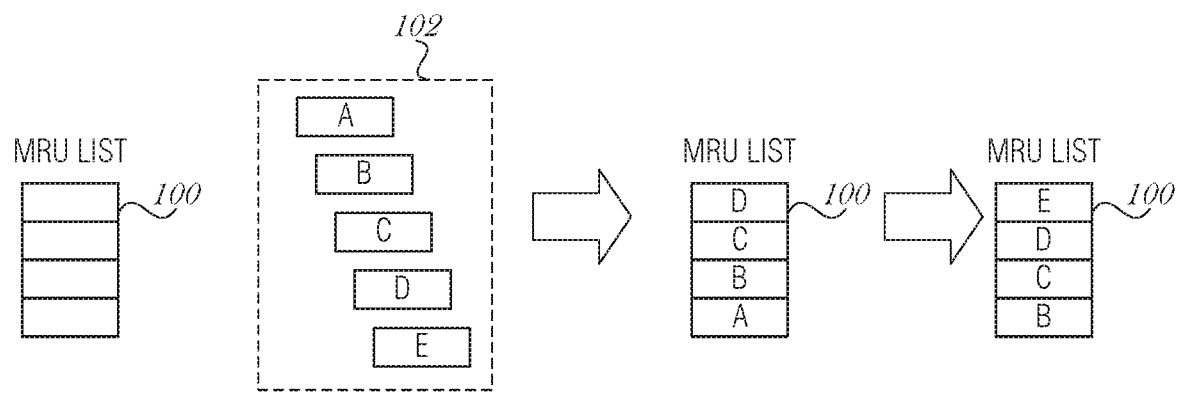
FIGS. 1A and 1B illustrate cache thrashing and a mechanism to remove cache thrashing for queueing, according to embodiments.
Figure 1B:
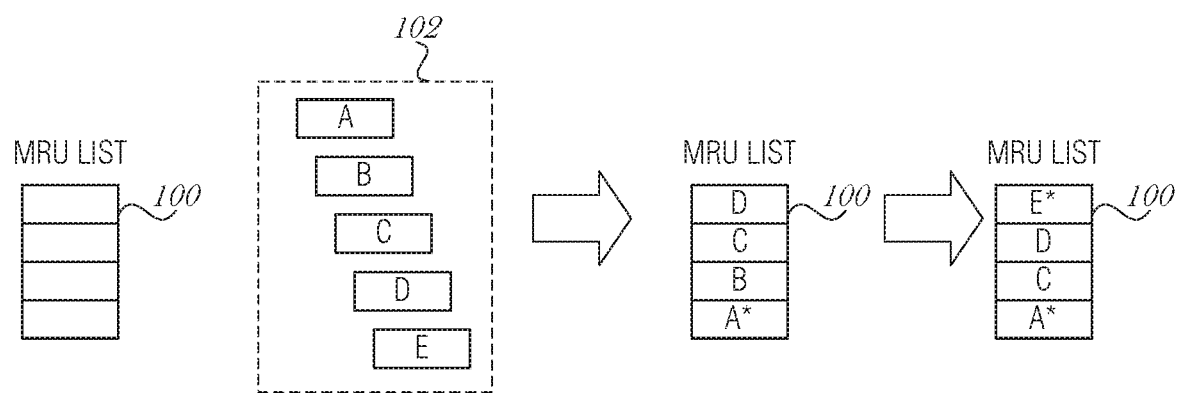

FIGS. 1A and 1B illustrate cache thrashing and a mechanism to remove cache thrashing for queueing, according to embodiments. A most recently used (MRU) cache list 100 is used to track cache lines and the recency of their last use. Assume that the cache has room for four cache lines. The MRU cache list 100 is organized with the most-recently used cache line at the top and the least-recently used cache line at the bottom. A queue 102 includes data that exists in cache lines A, B, C, D, and E, with data in cache line A being the head of the queue and data in cache line E at the tail. As the queue 102 is accessed or created, blocks A, B, C, and D are read into cache. The least-recently used data in block A is at the bottom of the MRU list 100. Thus, when block E is accessed, block A is evicted. Now, when the queue 102, is accessed in sequence again to process the data stored in the queue 102, it is accessed in a FIFO manner and block A is accessed first. Because block A does not exist in cache, it is fetched from external memory (e.g., main memory). Block B is the LRU block, so it is evicted. Each successive block results in a cache miss and a read from external memory. The end result is complete cache thrashing and high overhead in memory operations.

FIG. 1B illustrates a mechanism to remove cache thrashing in queuing operations. Certain cache lines are protected from eviction. In particular, the cache lines that contain the queue's head and tail are marked so that they cannot be evicted. Because a queue is designed to read from the head and write to the tail, protecting these portions of data ensures that no thrashing may occur. As such, in FIG. 1B, as the queue 102 is read into cache, the head (block A) is marked as 'do not evict'. This is depicted with a star ('*') in cache line A of the MRU list 100. When block E is loaded into the cache, cache line A is not evicted because of its protected status, and instead cache line B is evicted (as being the second oldest data). In addition, cache line E is marked as 'do not evict'. As the queue 100 grows, cache line E is accessed and additional data may be written to the address space in cache line E until it is full. Then a new cache line is fetched from external memory, marked as 'do not evict', and placed into cache and the MRU list 100. Similarly, as the queue 102 is used and data is dequeued, cache line A is used. After all of cache line A has been exhausted (e.g., dequeued and processed), then block B is read into cache and placed in the MRU list 100 according to an MRU policy. Because block B is now the head of the queue, it is marked as 'do not evict'.

In general, cache lines are marked as 'protected from eviction' based on the knowledge that these lines are the head or tail of a queue 102. Additionally, the cache line with the head of the queue 102 may be marked as 'immediate invalidate' when all of the data is used up (all contained entries had been popped from the head). This may be performed so that the data is not written back from cache to external memory. The only property required to guarantee this zero thrashing mechanism is to have a minimum number of cache lines of twice the number of queues. In other words, there needs to be at least a cache line for the head and another cache line for the tail of a queue.

Note that in a queuing application a read means a pop operation (or dequeue operation) and a write means a push operation (or enqueue operation). Thus, when the cache line is filled with data, it no longer requires protection. It may be evicted on cache policies, but a new tail is available to eliminate thrashing. Similarly, when a full cache line is read from cache by an application, it means that the cache line does not contain any information of interest and may be invalidated immediately without actually writing back anything to the external memory. A new queue head may be read into cache and used. This functionality has the added benefit that for shallow queues (which are fully cached), the queue 102 will not access the external memory at all, even though it is constantly being written and read with new data.

An extension to the mechanism protects three cache lines: one for the head of the queue, one for the tail of the queue, and one for the data next after the head of the queue. The third cache line may be used as a pre-fetch buffer, allowing the process that is using the queue to continue processing off of the head without waiting for a cache line to be fetched from external memory. For implementation of the two-cache line mechanism or the three-cache line mechanism, the cache maintains tracking of every queue and the cache line location to which each queue was last read or written.

Figure 2:
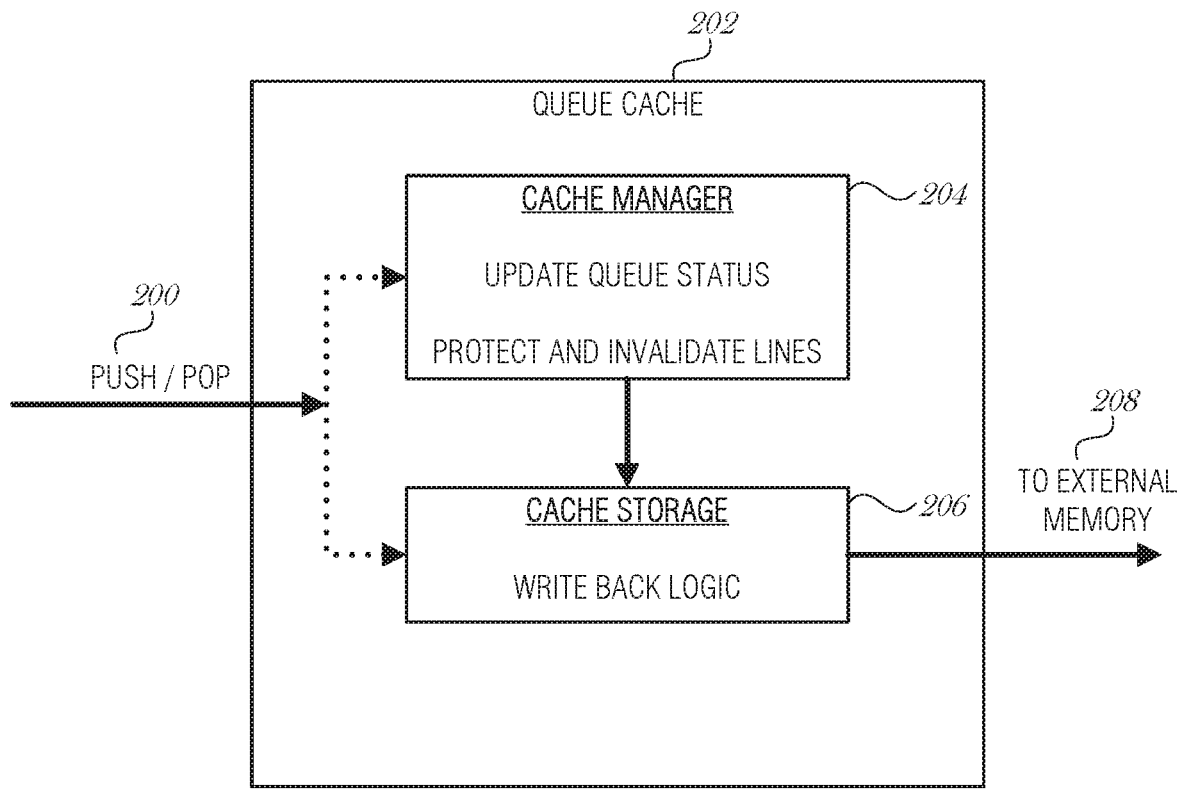
FIG. 2 is a block diagram illustrating a queue cache mechanism, according to an embodiment.

FIG. 2 is a block diagram illustrating a queue cache mechanism, according to an embodiment. Data may be pushed or popped from a queue (e.g., enqueued or dequeued, respectively) (operation flow 200). A queue cache 202 includes a cache manager 204 that operates to protect the cache line that contains the tail of the queue when data is pushed onto the queue. The cache line that contains the tail of the queue is written to cache storage 206, and may be written out to external memory (operation flow 208) when the cache line is filled.

Similarly, the cache manager 204 operates to protect the cache line that contains the head of the queue when data is popped from the queue. When a cache line is completely read out due to queue pops, then the cache line may be immediately invalidated. The next cache line that holds the next data in the queue may be read into the cache storage (on a cache miss), and protected so that it cannot be swapped out to external memory under cache management policies.

Further, while one cache manager 204 is illustrated in FIG. 2, it is understood that multiple cache managers may be used. For example, one cache manager may be used for each of multiple cores in a multi-core processor. This may be useful in a L1 data cache, for instance. Alternatively, a single cache manager may be used in cache that is shared among several cores, such as an L3 cache. In another embodiment, the cache manager for queues is separate from other data caches on chip and may be shared for queue usage across one or more cores. Cache lines for the long queues may mapped direct, M-way, or fully associative. With the exception of direct mapped, caches may use a replacement strategy of FIFO, random, or some sort of LRU approximation.

Figure 3A:
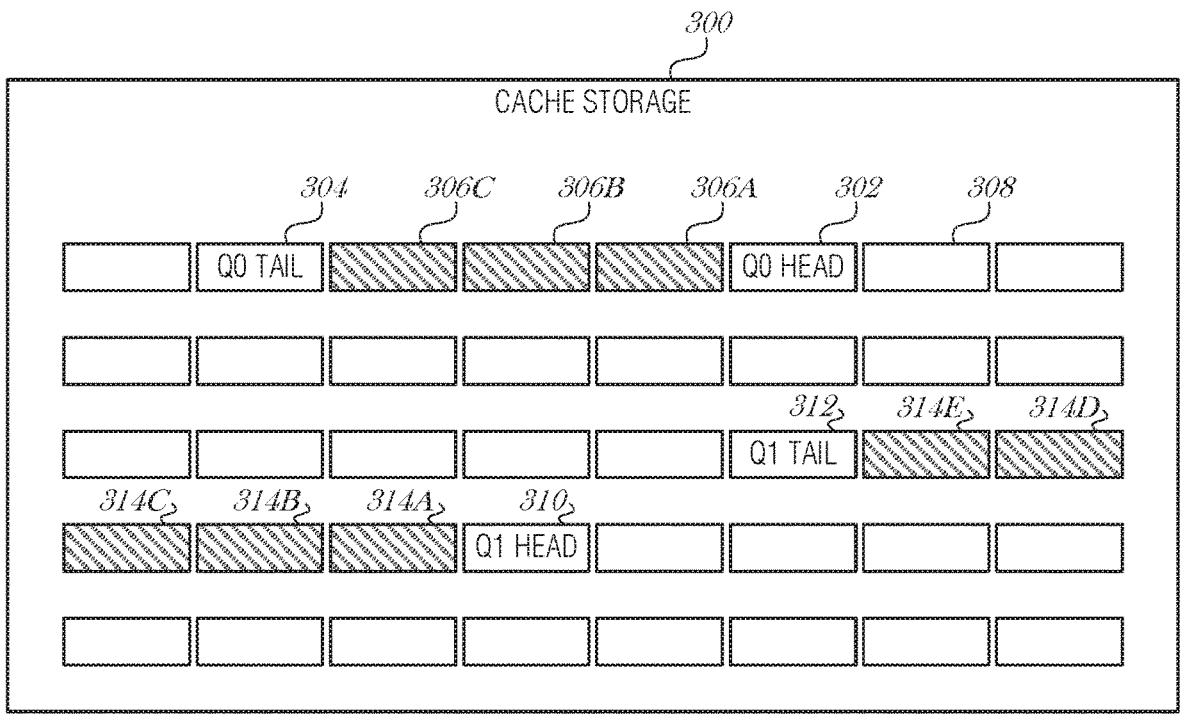
FIGS. 3A and 3B are block diagrams illustrating cache management, according to an embodiment.
Figure 3B:
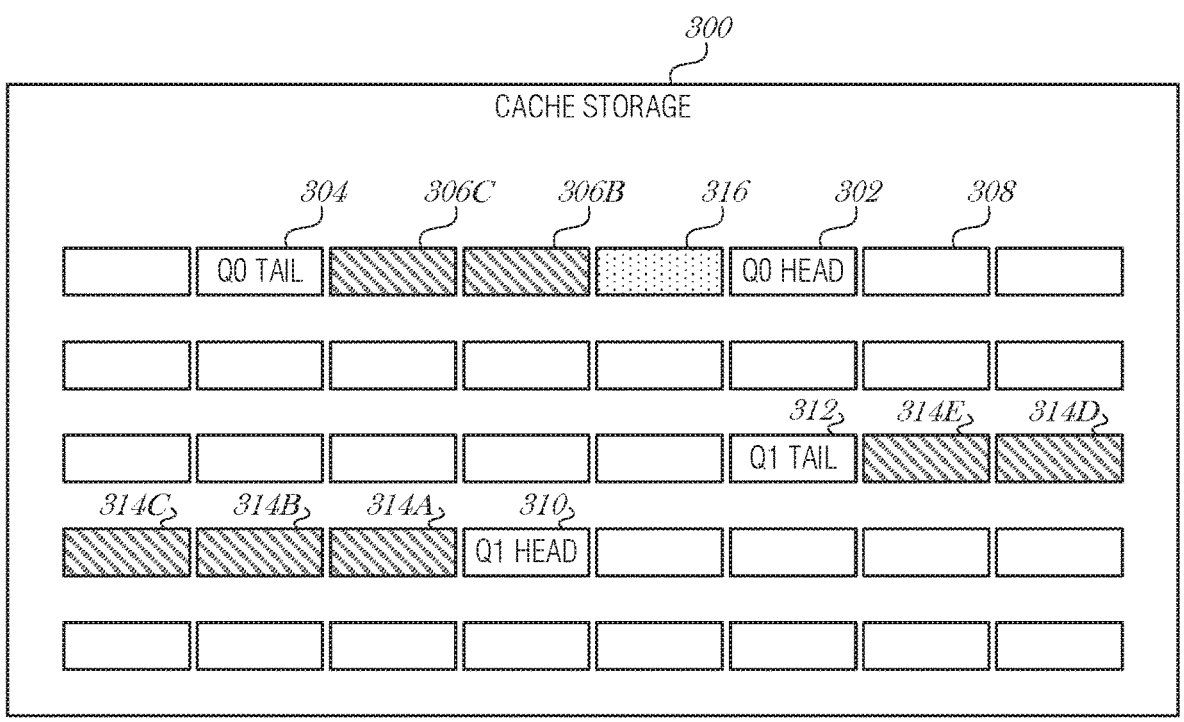

FIGS. 3A and 3B are block diagrams illustrating cache management, according to an embodiment. In FIG. 3A, the cache storage 300 (e.g., cache storage 206) may be configured to store two queues: "QUEUE 0" and "QUEUE 1", referred to as "Q0" and "Q1" respectively. The cache storage 300 includes a number of cache lines (represented by the blocks in cache storage 300). Queue Q0 includes a head cache line 302 and a tail cache line 304. Unprotected cache lines 306A, 306B, and 306C (collectively referred to as 306) represent the middle portion of the queue Q0. These unprotected cache lines 306 may be written out to external memory to make room for other cache contents, according to cache management policies. Maintaining the head and tail of the queue Q0 eliminates thrashing for the process that is using queue Q0.

Block 308 is a cache line that is the previous head cache line of queue Q0, which may be empty or invalidated after the processing of the queue Q0 has moved to the current head cache line 302.

Queue Q1 includes a head cache line 310 and a tail cache line 312, similar to the head and tail cache lines used for queue Q0. Unprotected cache lines 314A, 314B, 314C, 314D, and 314E (collectively referred to as 314), may be used as regular cache lines, according to cache management policies.

FIG. 3B is another illustrating of cache storage 300 using three protected cache lines for queue Q0. The head cache line 302 and tail cache line 304 are protected along with a pre-fetch cache line of Q0 316, which ensures a cache hit for the process using the queue Q0 as the process exhausts the data in the head cache line 302. It is understood that additional pre-fetch cache lines may be used so that more than one pre-fetch cache line is available for a given queue. This is a design consideration that trades memory usage for faster queue processing. Additionally, the multiple queues may use two, three, or more protected cache lines per queue, as space and design permit. For instance, the example in FIG. 3B includes queue Q0 that uses three protected cache lines and queue Q1 that uses two protected cache lines. As another example, queue Q0 may use three protected cache lines and queue Q1 may also use three protected cache lines. As yet another example, queue Q0 may use three protected cache lines, queue Q1 may also use three protected cache lines, and queue Q2 may use two protected cache lines. As yet another example, queue Q0 may use two protected cache lines, queue Q1 may use three protected cache lines, and queue Q2 may use four protected cache lines. Any number of combinations and permutations of cache line protection may be used and is considered within the scope of this disclosure.

Figure 4:
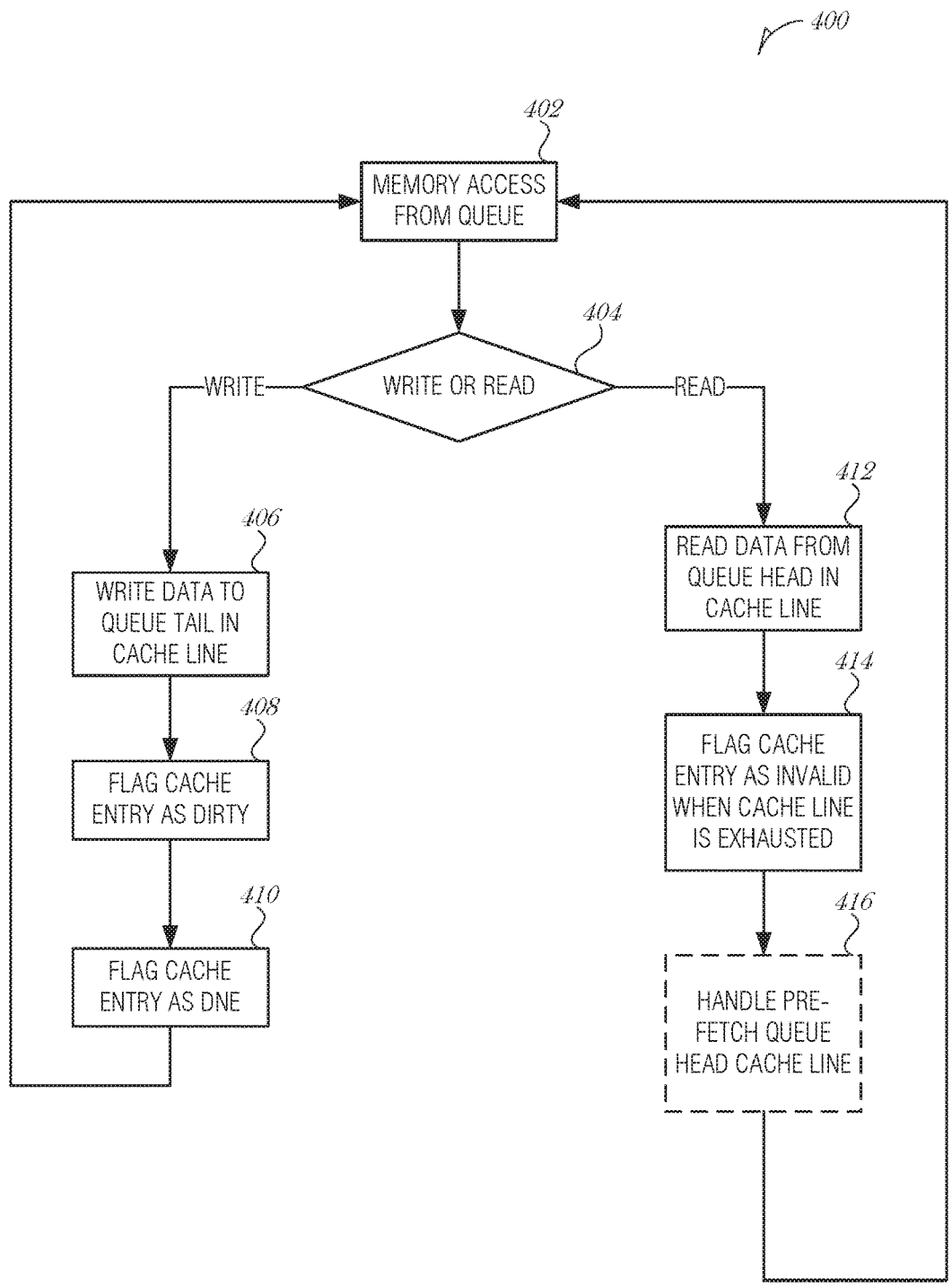
FIG. 4 is a flowchart illustrating a process to implement a zero thrash cache queue manager, according to an embodiment.

FIG. 4 is a flowchart illustrating a process 400 to implement a zero thrash cache queue manager, according to an embodiment. In modern architectures, memory accesses from a core through the memory subsystem are a combination of a specific request (e.g., read, write, etc.) and the needed physical memory addresses, and perhaps data. Data moves around most of the memory subsystem in 64-byte quantities called cache lines. A cache entry is filled when a cache line is copied into it. A cache entry may include the data from the cache line, a memory location, and flags. The memory location may be a portion of the physical address, a virtual address, an index, or the like. In an example, the memory location may include a portion of the physical address (e.g., the n most significant bits), an index describing which cache entry the data has been put in, and a block offset specifying the byte position within the cache line of a particular cache entry.

The flags include a valid flag, a dirty flag, and a protected flag. The valid flag is used to indicate whether the cache entry has been loaded with valid data. On power-up, the hardware sets all the valid bits in all the cache entries to "invalid". Invalid cache entries may be evicted without writing data out to external memory (e.g., main memory).

The dirty bit is used to indicate whether data in the cache entry has been changed since it was read from external memory into the cache. Dirty data is a cache line that has been changed by a processor, whose data that has not yet been propagated back to external memory.

The protected flag is used to indicate that the cache entry is not to be evicted. The protected flag may also be referred to as a "do not evict" (DNE) flag or bit. The protected flag is used in the system described in this document to protect the cache entries that contain the head and tail of a queue. Additional cache lines may be protected, such as a pre-fetched portion of the queue that is next after the current head of the queue.

During a memory read operation, if a cache has the requested physical address in a cache entry, the cache returns the data. If not, the cache requests the data from deeper in the memory subsystem and evicts some cache entry to make room. If the evicted cache entry has been modified, it must be written to the deeper memory subsystem as part of this eviction. This means a stream of reads may slow down because an earlier set of writes must be pushed deeper into the memory subsystem.

During a memory write operation, if the cache does not have the cache line in a cache entry, the cache reads it from deeper in the memory subsystem. It evicts some other physical address from its cache entry to make room for this cache line. The read is necessary to get all 64 bytes even though the write is likely only changing some of them. The first time a cache entry is written, the cache entries of this physical address in all other caches are invalidated. This action makes the first write on a cache entry more expensive than later writes.

Using the implementation described here for queue caching, a cache miss is not possible. Instead, when a queue is created by a process and the first element is added to a queue, the cache line that contains the data for the element is marked as 'do not evict'. This cache entry represents both the head and the tail of the queue, as it only has one element and only exists in one cache line. As the queue expands over several cache lines, then there may be a separate cache line for the head and another cache line for the tail. Being that the head and the tail cache lines are never evicted from cache, there is never a cache miss, hence, a zero thrashing property of a managed queue cache.

Turning now to the flowchart in FIG. 4, at 402, a memory access request for a queue is received. It is determined whether the memory access request is a write operation (e.g., push or enqueue operation), or a read operation (e.g., pop or dequeue operation) at decision block 404. When the memory access request is a write operation, at operation 406, the data in the cache line is updated with the data being enqueued, and the cache entry is marked as 'dirty' as a result of the revised state (operation 408). The cache entry that includes the tail of the queue is flagged as 'do not evict' (operation 410). The cache entry may be marked as 'do not evict' after every write operation. Other conventional cache operations may occur to store memory address information, flag the cache entry as valid, invalidate other cache entries with the same physical address, and the like. The process 400 returns to operation 402 to receive the next memory access request for the queue.

When the memory access request is a read operation, then the cache entry for the head of the queue is accessed (operation 412). If the read operation is accessing the last data entry in the cache line, then the cache entry is exhausted and the cache entry may be marked as "invalid" immediately (operation 414).

In one alternative implementation a pre-fetched queue head is maintained. As the queue grows over time, the next queue head cache entry may be identified and marked as 'do not evict' as part of the process of memory allocation and cache management. However, when one queue head cache entry is exhausted, there is no guarantee that the third cache line in order is in cache. Therefore, to maintain a pre-fetched queue head after a cache entry is exhausted, a new pre-fetch queue head may be read from external memory into cache and marked as 'do not evict'. Operation 416 may be optionally executed depending on whether a pre-fetch head cache line is maintained. Operation 416 may read another cache line into cache and mark it as 'do not evict' to pre-fetch the next queue head that is "on deck". If the next queue head cache line is the same as the cache line used for the tail (e.g., the number of elements have been dequeued so that the queue is contained in two cache lines, one for the current head and one for the tail), then the operation 416 may terminate without reading data into cache.

Figure 5:
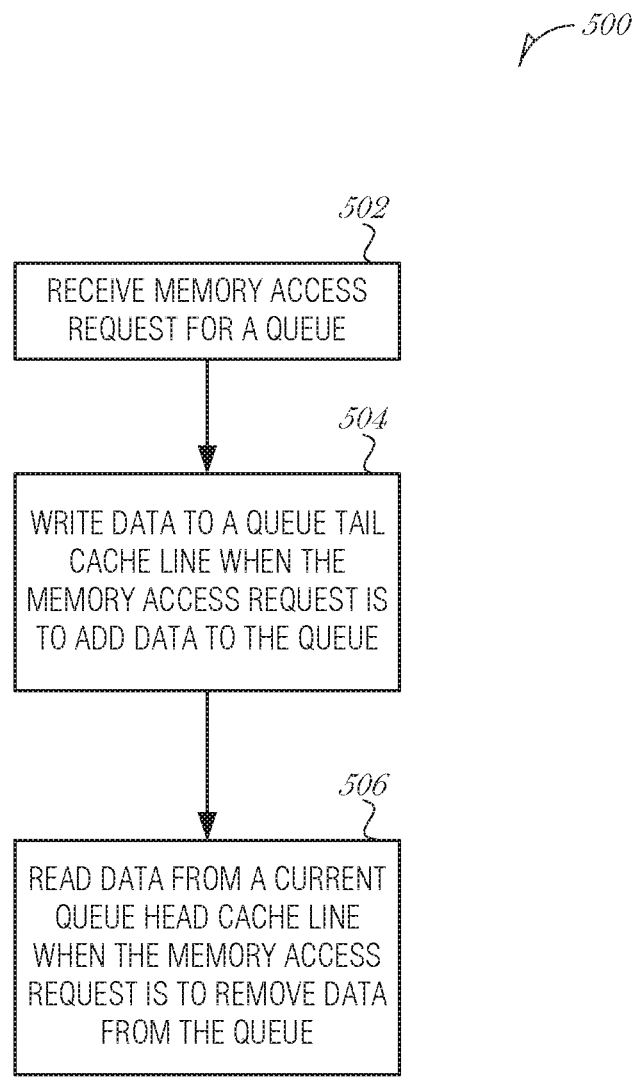
FIG. 5 is a flowchart illustrating a method for implementing a zero thrash cache queue manager, according to an embodiment.

FIG. 5 is a flowchart illustrating a method 500 for implementing a zero thrash cache queue manager, according to an embodiment. At 502, a memory access request for a queue is received. The memory access may be received in hardware, for example, at a cache controller that is on-die with one or more processor cores. Alternatively, the memory access may be received at a higher level in hardware or software, such as at memory management unit, a device driver, operating system library, or the like.

At 504, data is written to a queue tail cache line in a cache when the memory access request is to add data to the queue. The queue tail cache line is protected from being evicted from the cache.

In an embodiment, the queue tail cache line is protected from being evicted from the cache using a flag in a cache entry, the cache entry containing the queue tail cache line. In a further embodiment, the method 500 includes setting the flag in the cache entry to protect the queue tail cache line from being evicted each time data is written to the queue tail cache line. In a related embodiment, the method 500 includes flagging the cache entry that contains the queue tail cache line as dirty as a result of writing data to the queue tail cache line.

In an embodiment, the method 500 includes flagging the cache entry as invalid when reading data from the current queue head cache line exhausts the data in the current queue head cache line.

At 506, data is read from a current queue head cache line in the cache when the memory access request is to remove data from the queue. The current queue head cache line is protected from being evicted from the cache.

In an embodiment, the method 500 includes maintaining a pre-fetch queue head cache line, the pre-fetch queue head cache line being the next queue head cache line in the queue with respect to the current queue head cache line. In a further embodiment, maintaining the pre-fetch queue head cache line includes marking a pre-fetch queue head cache entry to protect the pre-fetch queue head cache line from being evicted from the cache, the pre-fetch queue head cache entry containing the pre-fetch queue head cache line. In a related embodiment, maintaining the pre-fetch queue head cache line includes obtaining the pre-fetch queue head cache line from external memory, and flagging a pre-fetch queue head cache entry to protect the pre-fetch queue head cache line from being evicted from the cache, the pre-fetch queue head cache entry containing the pre-fetch queue head cache line.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (CPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 6:
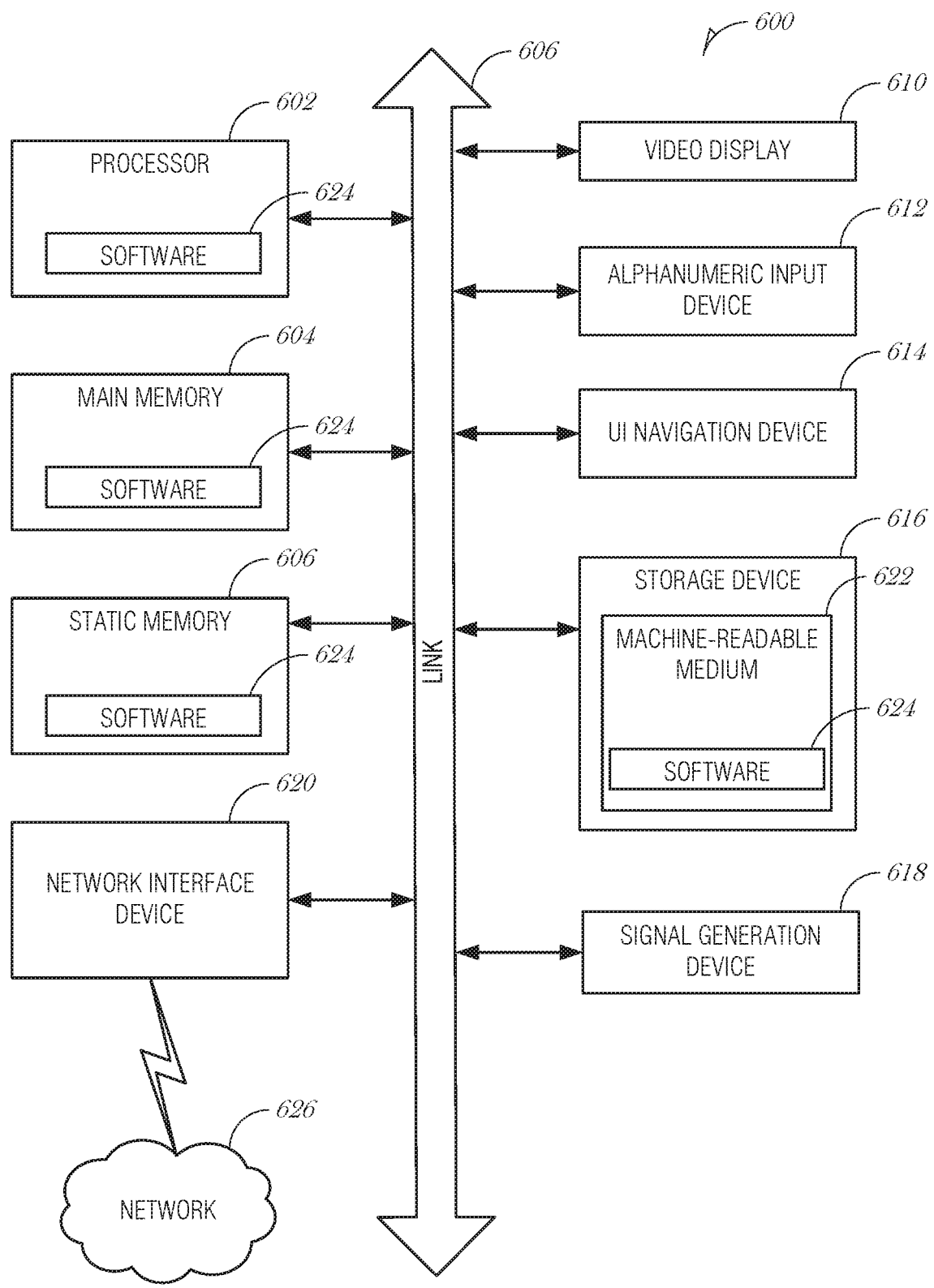
FIG. 6 is a block diagram illustrating an example machine upon which any one or more of the techniques (e.g., methodologies) discussed herein may perform, according to an embodiment.

FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 is a system for implementing a zero thrash cache queue manager, the system comprising: a processor subsystem to: receive a memory access request for a queue; write data to a queue tail cache line in a cache when the memory access request is to add data to the queue, the queue tail cache line protected from being evicted from the cache; and read data from a current queue head cache line in the cache when the memory access request is to remove data from the queue, the current queue head cache line protected from being evicted from the cache.

In Example 2, the subject matter of Example 1 includes, wherein the queue tail cache line is protected from being evicted from the cache using a flag in a cache entry, the cache entry containing the queue tail cache line.

In Example 3, the subject matter of Example 2 includes, wherein the processor subsystem is to set the flag in the cache entry to protect the queue tail cache line from being evicted each time data is written to the queue tail cache line.

In Example 4, the subject matter of Examples 2-3 includes, wherein the processor subsystem is to flag the cache entry that contains the queue tail cache line as dirty as a result of writing data to the queue tail cache line.

In Example 5, the subject matter of Examples 2-4 includes, wherein the processor subsystem is to flag the cache entry as invalid when reading data from the current queue head cache line exhausts the data in the current queue head cache line.

In Example 6, the subject matter of Examples 1-5 includes, wherein the processor subsystem is to maintain a pre-fetch queue head cache line, the pre-fetch queue head cache line being the next queue head cache line in the queue with respect to the current queue head cache line.

In Example 7, the subject matter of Example 6 includes, wherein to maintain the pre-fetch queue head cache line, the processor subsystem is to mark a pre-fetch queue head cache entry to protect the pre-fetch queue head cache line from being evicted from the cache, the pre-fetch queue head cache entry containing the pre-fetch queue head cache line.

In Example 8, the subject matter of Examples 6-7 includes, wherein to maintain the pre-fetch queue head cache line, the processor subsystem is to obtain the pre-fetch queue head cache line from external memory, and flag a pre-fetch queue head cache entry to protect the pre-fetch queue head cache line from being evicted from the cache, the pre-fetch queue head cache entry containing the pre-fetch queue head cache line.

Example 9 is a method of implementing a zero thrash cache queue manager, the method comprising: receiving a memory access request for a queue; writing data to a queue tail cache line in a cache when the memory access request is to add data to the queue, and protecting the queue tail cache line from being evicted from the cache; and reading data from a current queue head cache line in the cache, when the memory access request is to remove data from the queue, the current queue head cache line protected from being evicted from the cache.

In Example 10, the subject matter of Example 9 includes, wherein the queue tail cache line is protected from being evicted from the cache using a flag in a cache entry, the cache entry containing the queue tail cache line.

In Example 11, the subject matter of Example 10 includes, setting the flag in the cache entry to protect the queue tail cache line from being evicted each time data is written to the queue tail cache line.

In Example 12, the subject matter of Examples 10-11 includes, flagging the cache entry that contains the queue tail cache line as dirty as a result of writing data to the queue tail cache line.

In Example 13, the subject matter of Examples 10-12 includes, flagging the cache entry as invalid when reading data from the current queue head cache line exhausts the data in the current queue head cache line.

In Example 14, the subject matter of Examples 9-13 includes, maintaining a pre-fetch queue head cache line, the pre-fetch queue head cache line being the next queue head cache line in the queue with respect to the current queue head cache line.

In Example 15, the subject matter of Example 14 includes, wherein maintaining the pre-fetch queue head cache line includes marking a pre-fetch queue head cache entry to protect the pre-fetch queue head cache line from being evicted from the cache, the pre-fetch queue head cache entry containing the pre-fetch queue head cache line.

In Example 16, the subject matter of Examples 14-15 includes, wherein maintaining the pre-fetch queue head cache line includes obtaining the pre-fetch queue head cache line from external memory, and flagging a pre-fetch queue head cache entry to protect the pre-fetch queue head cache line from being evicted from the cache, the pre-fetch queue head cache entry containing the pre-fetch queue head cache line.

Example 17 is at least one machine-readable medium including instructions, which when executed by a machine, cause the machine to perform operations of any of the methods of Examples 9-16.

Example 18 is an apparatus comprising means for performing any of the methods of Examples 9-16.

Example 19 is an apparatus for implementing a zero thrash cache queue manager, the apparatus comprising: means for receiving a memory access request for a queue; means for writing data to a queue tail cache line in a cache when the memory access request is to add data to the queue, and protecting the queue tail cache line from being evicted from the cache; and means for reading data from a current queue head cache line in the cache when the memory access request is to remove data from the queue, the current queue head cache line protected from being evicted from the cache.

In Example 20, the subject matter of Example 19 includes, wherein the queue tail cache line is protected from being evicted from the cache using a flag in a cache entry, the cache entry containing the queue tail cache line.

In Example 21, the subject matter of Example 20 includes, means for setting the flag in the cache entry to protect the queue tail cache line from being evicted each time data is written to the queue tail cache line.

In Example 22, the subject matter of Examples 20-21 includes, means for flagging the cache entry that contains the queue tail cache line as dirty as a result of writing data to the queue tail cache line.

In Example 23, the subject matter of Examples 20-22 includes, means for flagging the cache entry as invalid when reading data from the current queue head cache line exhausts the data in the current queue head cache line.

In Example 24, the subject matter of Examples 19-23 includes, means for maintaining a pre-fetch queue head cache line, the pre-fetch queue head cache line being the next queue head cache line in the queue with respect to the current queue head cache line.

In Example 25, the subject matter of Example 24 includes, wherein the means for maintaining the pre-fetch queue head cache line include means for marking a pre-fetch queue head cache entry to protect the pre-fetch queue head cache line from being evicted from the cache, the pre-fetch queue head cache entry containing the pre-fetch queue head cache line.

In Example 26, the subject matter of Examples 24-25 includes, wherein the means for maintaining the pre-fetch queue head cache line include means for obtaining the pre-fetch queue head cache line from external memory, and means for flagging a pre-fetch queue head cache entry to protect the pre-fetch queue head cache line from being evicted from the cache, the pre-fetch queue head cache entry containing the pre-fetch queue head cache line.

Example 27 is at least one machine-readable medium including instructions for implementing a zero thrash cache queue manager, the instructions when executed by a machine, cause the machine to perform operations comprising: receiving a memory access request for a queue; writing data to a queue tail cache line in a cache when the memory access request is to add data to the queue, and protecting the queue tail cache line from being evicted from the cache; and reading data from a current queue head cache line in the cache when the memory access request is to remove data from the queue, the current queue head cache line protected from being evicted from the cache.

In Example 28, the subject matter of Example 27 includes, wherein the queue tail cache line is protected from being evicted from the cache using a flag in a cache entry, the cache entry containing the queue tail cache line.

In Example 29, the subject matter of Example 28 includes, instructions that cause the machine to perform operations of setting the flag in the cache entry to protect the queue tail cache line from being evicted each time data is written to the queue tail cache line.

In Example 30, the subject matter of Examples 28-29 includes, instructions that cause the machine to perform operations of flagging the cache entry that contains the queue tail cache line as dirty as a result of writing data to the queue tail cache line.

In Example 31, the subject matter of Examples 28-30 includes, instructions that cause the machine to perform operations of flagging the cache entry as invalid when reading data from the current queue head cache line exhausts the data in the current queue head cache line.

In Example 32, the subject matter of Examples 27-31 includes, instructions that cause the machine to perform operations of maintaining a pre-fetch queue head cache line, the pre-fetch queue head cache line being the next queue head cache line in the queue with respect to the current queue head cache line.

In Example 33, the subject matter of Example 32 includes, wherein maintaining the pre-fetch queue head cache line includes marking a pre-fetch queue head cache entry to protect the pre-fetch queue head cache line from being evicted from the cache, the pre-fetch queue head cache entry containing the pre-fetch queue head cache line.

In Example 34, the subject matter of Examples 32-33 includes, wherein maintaining the pre-fetch queue head cache line includes obtaining the pre-fetch queue head cache line from external memory, and flagging a pre-fetch queue head cache entry to protect the pre-fetch queue head cache line from being evicted from the cache, the pre-fetch queue head cache entry containing the pre-fetch queue head cache line.

Example 35 is at least one machine-readable medium including instructions that, when executed by a processor subsystem, cause the processor subsystem to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for implementing a zero thrash cache queue manager, the system comprising:
   a processor subsystem to:
      receive a memory access request for a queue;
      write data to a queue tail cache line in a cache when the memory access request is to add data to the queue, the queue tail cache line protected from being evicted from the cache for a first indefinite period or until the queue tail cache line is full, wherein the queue tail cache line is protected from being evicted from the cache using a flag in a cache entry, the cache entry containing the queue tail cache line;
      set the flag in the cache entry to protect the queue tail cache line from being evicted each time data is written to the queue tail cache line; and
      read data from a current queue head cache line in the cache when the memory access request is to remove data from the queue, the current queue head cache line protected from being evicted from the cache for a second indefinite period or until the entire current queue head cache line has been accessed.

2. The system of claim 1, wherein the processor subsystem is to flag the cache entry that contains the queue tail cache line as dirty as a result of writing data to the queue tail cache line.

3. The system of claim 1, wherein the processor subsystem is to flag the cache entry as invalid when reading data from the current queue head cache line exhausts the data in the current queue head cache line.

4. The system of claim 1, wherein the processor subsystem is to maintain a pre-fetch queue head cache line, the pre-fetch queue head cache line being the next queue head cache line in the queue with respect to the current queue head cache line.

5. The system of claim 4, wherein to maintain the pre-fetch queue head cache line, the processor subsystem is to mark a pre-fetch queue head cache entry to protect the pre-fetch queue head cache line from being evicted from the cache, the pre-fetch queue head cache entry containing the pre-fetch queue head cache line.

6. The system of claim 4, wherein to maintain the pre-fetch queue head cache line, the processor subsystem is to obtain the pre-fetch queue head cache line from external memory, and flag a pre-fetch queue head cache entry to protect the pre-fetch queue head cache line from being evicted from the cache, the pre-fetch queue head cache entry containing the pre-fetch queue head cache line.

7. A method of implementing a zero thrash cache queue manager, the method comprising:
   receiving a memory access request for a queue;
   writing data to a queue tail cache line in a cache when the memory access request is to add data to the queue, and protecting the queue tail cache line from being evicted from the cache for a first indefinite period or until the queue tail cache line is full, wherein the queue tail cache line is protected from being evicted from the cache using a flag in a cache entry, the cache entry containing the queue tail cache line;

setting the flag in the cache entry to protect the queue tail cache line from being evicted each time data is written to the queue tail cache line; and reading data from a current queue head cache line in the cache when the memory access request is to remove data from the queue, the current queue head cache line protected from being evicted from the cache for a second indefinite period or until the entire current queue head cache line has been accessed.

8. The method of claim 7, further comprising flagging the cache entry that contains the queue tail cache line as dirty as a result of writing data to the queue tail cache line.

9. The method of claim 7, further comprising flagging the cache entry as invalid when reading data from the current queue head cache line exhausts the data in the current queue head cache line.

10. The method of claim 7, further comprising maintaining a pre-fetch queue head cache line, the pre-fetch queue head cache line being the next queue head cache line in the queue with respect to the current queue head cache line.

11. The method of claim 10, wherein maintaining the pre-fetch queue head cache line includes marking a pre-fetch queue head cache entry to protect the pre-fetch queue head cache line from being evicted from the cache, the pre-fetch queue head cache entry containing the pre-fetch queue head cache line.

12. The method of claim 10, wherein maintaining the pre-fetch queue head cache line includes obtaining the pre-fetch queue head cache line from external memory, and flagging a pre-fetch queue head cache entry to protect the pre-fetch queue head cache line from being evicted from the cache, the pre-fetch queue head cache entry containing the pre-fetch queue head cache line.

13. At least one non-transitory machine-readable medium including instructions for implementing a zero thrash cache queue manager, the instructions when executed by a machine, cause the machine to perform operations comprising:

receiving a memory access request for a queue;

writing data to a queue tail cache line in a cache when the memory access request is to add data to the queue, and protecting the queue tail cache line from being evicted from the cache for a first indefinite period or until the queue tail cache line is full, wherein the queue tail cache line is protected from being evicted from the cache using a flag in a cache entry, the cache entry containing the queue tail cache line;

setting the flag in the cache entry to protect the queue tail cache line from being evicted each time data is written to the queue tail cache line; and reading data from a current queue head cache line in the cache when the memory access request is to remove data from the queue, the current queue head cache line protected from being evicted from the cache for a second indefinite period or until the entire current queue head cache line has been accessed.

14. The machine-readable medium of claim 13, further comprising instructions that cause the machine to perform operations of flagging the cache entry that contains the queue tail cache line as dirty as a result of writing data to the queue tail cache line.

15. The machine-readable medium of claim 13, further comprising instructions that cause the machine to perform operations of flagging the cache entry as invalid when reading data from the current queue head cache line exhausts the data in the current queue head cache line.

16. The machine-readable medium of claim 13, further comprising instructions that cause the machine to perform operations of maintaining a pre-fetch queue head cache line, the pre-fetch queue head cache line being the next queue head cache line in the queue with respect to the current queue head cache line.

17. The machine-readable medium of claim 16, wherein maintaining the pre-fetch queue head cache line includes marking a pre-fetch queue head cache entry to protect the pre-fetch queue head cache line from being evicted from the cache, the pre-fetch queue head cache entry containing the pre-fetch queue head cache line.

18. The machine-readable medium of claim 16, wherein maintaining the pre-fetch queue head cache line includes obtaining the pre-fetch queue head cache line from external memory, and flagging a pre-fetch queue head cache entry to protect the pre-fetch queue head cache line from being evicted from the cache, the pre-fetch queue head cache entry containing the pre-fetch queue head cache line.

* * * * *